(12) United States Patent
Sim et al.

(10) Patent No.: US 10,477,252 B2
(45) Date of Patent: Nov. 12, 2019

(54) METHOD AND APPARATUS FOR EMPLOYING DYNAMIC RANGE MAPPING INFORMATION FOR HDR IMAGE DECODER CONSIDERING BACKWARD COMPATIBILITY

(71) Applicant: KWANGWOON UNIVERSITY INDUSTRY-ACADEMIC COLLABORATION FOUNDATION, Seoul (KR)

(72) Inventors: Donggyu Sim, Seoul (KR); Seanae Park, Seoul (KR); Yongjo Ahn, Seoul (KR); Jonghyun Ma, Seoul (KR); Jeongyun Lim, Seoul (KR)

(73) Assignee: Kwangwoon University Industry-Academic Collaboration Foundation, Seoul (KR)

( * ) Notice: Subject to any disclaimer, the term of this patent is extended or adjusted under 35 U.S.C. 154(b) by 22 days.

(21) Appl. No.: 15/183,492

(22) Filed: Jun. 15, 2016

(65) Prior Publication Data

US 2016/0373768 A1 Dec. 22, 2016

(30) Foreign Application Priority Data

Jun. 16, 2015 (KR) ........................ 10-2015-0085474

(51) Int. Cl.
*H04N 19/00* (2014.01)
*H04N 19/98* (2014.01)
*H04N 19/30* (2014.01)

(52) U.S. Cl.
CPC ............. *H04N 19/98* (2014.11); *H04N 19/30* (2014.11)

(58) Field of Classification Search
CPC ............................. H04N 19/30; H04N 19/98
See application file for complete search history.

(56) References Cited

U.S. PATENT DOCUMENTS

| | | | | |
|---|---|---|---|---|
| 2011/0090959 A1* | 4/2011 | Wiegand | ............... | H04N 19/593 375/240.12 |
| 2011/0235720 A1* | 9/2011 | Banterle | ................. | G06T 5/009 375/240.25 |
| 2013/0108183 A1* | 5/2013 | Bruls | ....................... | G06T 9/004 382/233 |
| 2013/0223531 A1* | 8/2013 | Garbas | ................. | H04N 19/105 375/240.14 |
| 2014/0044372 A1* | 2/2014 | Mertens | ................. | H04N 19/46 382/248 |
| 2014/0241418 A1* | 8/2014 | Garbas | ............. | H04N 19/00042 375/240.02 |
| 2016/0286226 A1* | 9/2016 | Ridge | .................... | H04N 19/30 |
| 2016/0379346 A1* | 12/2016 | Liu | ......................... | G06T 5/009 382/169 |

* cited by examiner

*Primary Examiner* — Zhihan Zhou
(74) *Attorney, Agent, or Firm* — NSIP Law (57) ABSTRACT

The present invention enables efficient decoding by using DR mapping information between a base layer and an enhancement layer in various manners in an HDR decoder considering backward compatibility.

2 Claims, 5 Drawing Sheets

METHOD AND APPARATUS FOR EMPLOYING DYNAMIC RANGE MAPPING INFORMATION FOR HDR IMAGE DECODER CONSIDERING BACKWARD COMPATIBILITY

CROSS-REFERENCE TO RELATED APPLICATIONS

This application claims the benefit of Korean Patent Application No. 10-2015-0085474, filed on Jun. 16, 2015, the entire disclosure of which is incorporated herein by reference for all purposes.

TECHNICAL FIELD

The present invention relates to image processing technology, and more particularly, to a method for using Dynamic Range (DR) mapping information in a High Dynamic Range (HDR) image decoder considering backward compatibility.

BACKGROUND ART

Demands for high-definition image service and high-quality image service such as Full High Definition (FHD) and Ultra High Definition (UHD) have recently been increased.

DISCLOSURE

Technical Problem

An object of embodiments of the present invention is to provide a method and apparatus for using Dynamic Range (DR) mapping information between a base layer and an enhancement layer in a High Dynamic Range (HDR) image decoder considering backward compatibility.

The objects of the present invention are not limited to the foregoing descriptions, and additional objects will become apparent to those having ordinary skill in the pertinent art to the present invention based upon the following descriptions.

Technical Solution

An embodiment of the present invention devised to achieve the above object includes a step and method for using DR mapping information in an HDR image decoder considering backward compatibility.

A method of decoding a video may comprise determining a mapping value relating to a image signal of a current block, decoding the image signal of the current block based on the mapping value, and reconstructing the current block using the image signal.

The mapping value may be defined for each predetermined interval.

The mapping value may be determined based on a mapping index which is signaled from an encoder.

The image signal of the current block may be decoded by inverse-mapping to a image signal corresponding to the mapping value.

The inverse-mapping may be performed by using a mapping table which defines a relation between the mapping value and the image signal.

The inverse-mapping may be performed by using mapping information indicating a mapping relation between the mapping value and the image signal.

The mapping information may include at least one of first information indicating a size of an interval to which the image belongs or second information indicating a gradient of the interval.

The image signal of the current block may be representative of an original signal of the current block or a residual signal relating to the current block.

Advantageous Effects

According to the foregoing technical solution, an HDR image decoder considering backward compatibility can efficiently decode and use DR mapping information.

BEST MODE TO CARRY OUT THE INVENTION

Embodiments of the present invention will be described in detail with reference to the attached drawings so that those skilled in the art may readily implement the present invention. However, the present invention may be implemented in various different ways, not limited to the described embodiments. Lest it should obscure the subject matter of the present invention, a part that is not related to the description of the present invention is omitted. Like reference numerals denote the same components throughout the specification.

When it is said that a component is connected to another component, it should be understood that the one component may be electrically connected to the other component, with a third component in between. In the present disclosure, when it is said that a part includes a component, this signifies the probable presence of another component, not excluding the presence of the component, unless otherwise specified.

Through the specification, when it is said that a part includes a component, this signifies the probable presence of another component, not excluding the presence of the component, unless otherwise specified. As used in the specification, a step of or a step to does not mean a step for.

The term as used herein, first or second may be used to describe various components, not limiting the components.

These expressions may be used to distinguish one component from another component.

In addition, components as used in embodiments of the present invention are shown independently to represent different characteristic functions, not meaning that each component is configured separately in a hardware or software unit. That is, each component is separately described for the convenience of description. At least two components may be incorporated into a single component or one component may be divided into a plurality of components. An embodiment in which components are incorporated into a single component or one component may be divided into a plurality of components also falls within the scope of the present invention.

Terms as used in the present application are described below in brief.

A image decoder as described later may be a device included in a server terminal such as a Personal Computer (PC), a laptop computer, a Portable Multimedia Player (PMP), a wireless communication terminal, a smartphone, a TV application server, and a service server. The image decoder may refer to various devices each including a user terminal such as various devices, a communication device such as a communication modem for conducting communication with a wired/wireless communication network, a memory for storing programs and data for decoding a image or performing inter-screen or intra-screen prediction for image decoding, and a microprocessor for performing computation and control by executing programs.

A image encoded into bit streams by an encoder may be transmitted to a image decoder in real time or non-real time through a wired/wireless communication network such as the Internet, a short-range wireless communication network, a Wireless Local Area Network (WLAN), a Wireless Broadband (WiBro) network, and a mobile communication network or via various communication interfaces such as a cable and a Universal Serial Bus (USB). Then, the image decoder may recover and reproduce the received bit streams into the image.

A scalable image refers to a image in which a compressed bit stream is configured hierarchically so as to be decoded at any bit rate. A single-layer decoder decodes only one bit stream supporting only one bit rate, frame rate, and image size, whereas a multi-layer image decoder may support scalability for various bit rates, frame rates, and image sizes.

In the Scalable Image Coding (SVC) standard, one bit stream is decoded into a plurality of image layers and each layer has its own bit rate, frame rate, image size, and image quality. In other words, one bit stream may include a base layer and scalable enhancement layers. In general, a image of the enhancement layer may be encoded to have a higher image quality than a image of a previous base layer. The term as used herein, a scalable image decoder may include a multi-layer image decoder.

Dynamic Range (DR) typically means the difference between a maximum signal and a minimum signal that a measuring system may measure at the same time. The DR may refer to a brightness range in which a image may be represented in the field of image processing and image compression.

Standard Dynamic Range (SDR) has a contrast ratio of 1,000:1 and a maximum brightness of 100 nits. In general, the SDR is called a standard contrast ratio.

High Dynamic Range (HDR) typically refers to a contrast ratio equal to or larger than 100,000:1 and has a maximum brightness of 4,000 nits. The HDR corresponds to a brightness range perceivable to the human eyes without luminance adaptation.

Enhanced Dynamic Range (EDR) refers to a contrast ratio between those of the SDR and HDR (i.e. equal to or lager than 1,000:1 and below 100,000:1). The EDR has a maximum brightness of 1,000 nits.

Further, an HDR image as used herein refers to a image having an HDR. In contrast to an SDR image, an HDR image may include a image having dynamic ranges being HDR and EDR.

In general, a image may be comprised of a series of pictures and each picture may be divided into predetermined areas called blocks. Those skilled in the art will understand that the term picture as used hereinbelow is interchangeably used with equivalent terms such as image and frame.

Now, a detailed description will be given of embodiments of the present invention with reference to the attached drawings. A redundant description of the same components will be avoided in describing the present invention.

Figure 1:
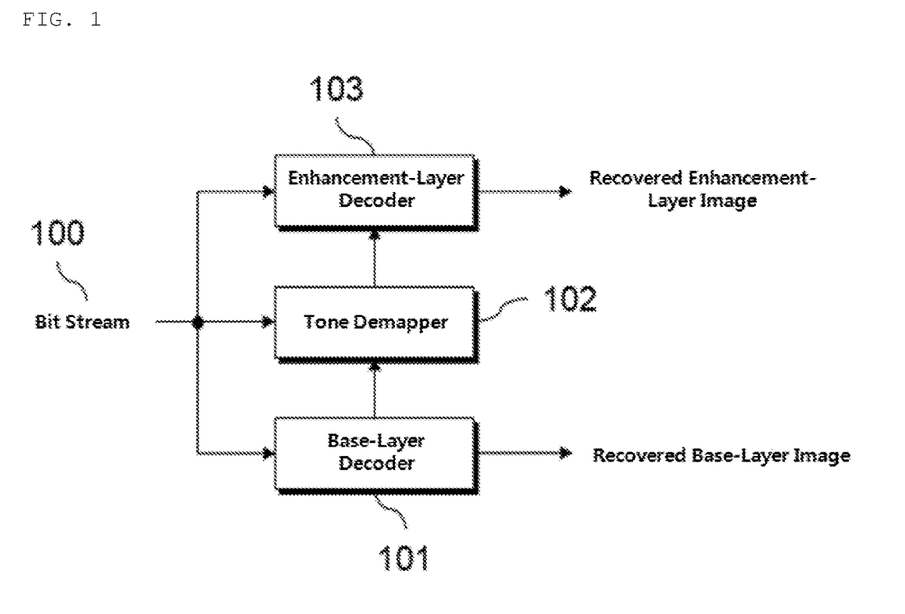
FIG. 1 is a block diagram of an HDR image decoder considering backward compatibility according to an embodiment of the present invention.

FIG. 1 is a block diagram of an HDR image decoder considering backward compatibility according to an embodiment of the present invention.

An input bit stream 100 may include a bit stream for a base-layer image and a bit stream for an enhancement-layer image. The input bit stream 100 may further include DR mapping information. Like an LDR or SDR image, a base-layer image is a image having a narrower DR than an enhancement-layer image. Like an EDR or HDR image, an enhancement-layer image is a image having a wider DR than a base-layer image.

A base-layer decoder 101 receives data of the base-layer image in the bit stream and decodes the received data. A tone demapper 102 maps the DR of the base-layer image recovered by the base-layer decoder 101 to the DR of the enhancement-layer image. Herein, data about mapping information may be extracted or induced from the bit stream.

An enhancement-layer decoder 103 receives the image mapped to the DR of the enhancement layer through the tone demapper 102 and data of the enhancement-layer image in the bit stream, and decodes the enhancement-layer image.

Figure 2:
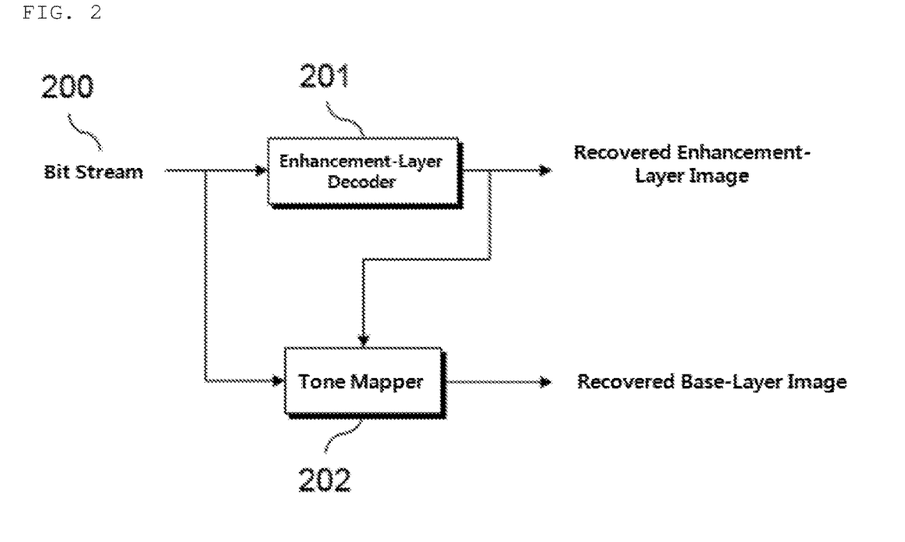
FIG. 2 is a block diagram of another HDR image decoder considering backward compatibility according to an embodiment of the present invention.

FIG. 2 is a block diagram of another HDR image decoder considering backward compatibility according to an embodiment of the present invention.

An input bit stream 200 may include a bit stream of an enhancement-layer image and DR mapping information.

An enhancement-layer decoder 201 receives data in the bit stream and decodes the enhancement-layer image.

A tone mapper 202 may generate a recovered base-layer image by mapping the DR of the recovered image received from the enhancement-layer decoder 201 to the DR of the base-layer image. Data relating to the mapping information may be extracted or induced from the bit stream.

Figure 3:
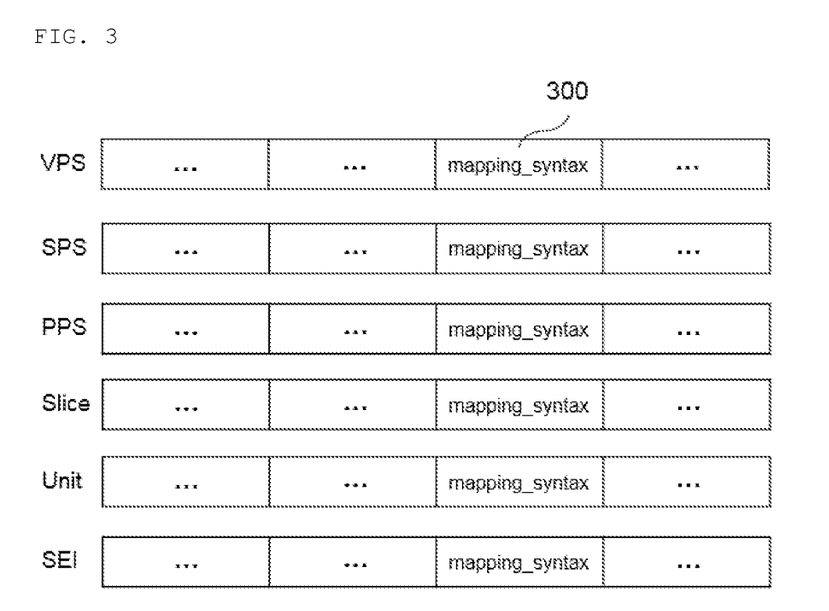
FIG. 3 is an exemplary view illustrating a step for decoding Dynamic Range (DR) mapping information according to an embodiment of the present invention.

FIG. 3 is an exemplary view illustrating unit-level transmission of DR mapping information according to an embodiment of the present invention.

Mapping_syntax 300 is data corresponding to DR mapping information. The DR mapping information may include information used to adjust the DR of an enhancement-layer image to the DR of a base-layer image or the DR of a base-layer image to the DR of an enhancement-layer image, such as DR mapping table information, DR parameter information, DR mapping index information, etc.

The DR mapping table information may be information about a table illustrating a DR mapping relationship between an enhancement layer and a base layer. The DR mapping table information may be defined as a single table applied commonly to one video sequence or a plurality of tables selectively available for predetermined units (e.g., a picture, slice, or block unit). Or a current unit may be controlled to invoke the same DR mapping table information of a neighbor unit in consideration of correlations between predetermined units. The correlations between the predetermined units may be determined, taking into account the ranges of pixel values of the predetermined units.

The DR parameter information may refer to parameters for modeling the DR mapping relationship between the enhancement layer and the base layer. For example, the parameters may include a parameter for DR adjustment, predetermined scaling factor information used for DR mapping, and offset information for compensating a DR.

The DR mapping index information may mean data for selectively using corresponding information, in the presence of a plurality of DR mapping tables or a plurality of pieces of DR parameter information. The DR mapping index information may increase coding efficiency through differential coding.

For example, only a differential value may be encoded as DR mapping index information allocated to a current block (a current slice, a current picture, etc.), using DR mapping index information allocated to a previous block (a previous slice, a previous picture, etc.) as a prediction value. The previous block may refer to an encoded block before the current block, including at least one of blocks adjacent to the current block.

The above description of mapping_syntax is an example and mapping_syntax may be implemented actually in a different manner. It is obvious that at least one of the above-described pieces of DR mapping information may be acquired from mapping_syntax encoded in an encoder or induced by a decoder.

Further, at least one of the above-described pieces of DR mapping information may decoded in a unit such as a Video Parameter Set (VPS), a Sequence Parameter Set (SPS), a Picture Parameter Set (PPS), a slice, a coding block, a prediction block, a transform block, etc., or an additional message (Supplemental Enhancement Information (SEI)). The at least one of the above-described pieces of DR mapping information may be decoded and applied in a different manner depending on a luminance component and a chrominance component.

Figure 4:
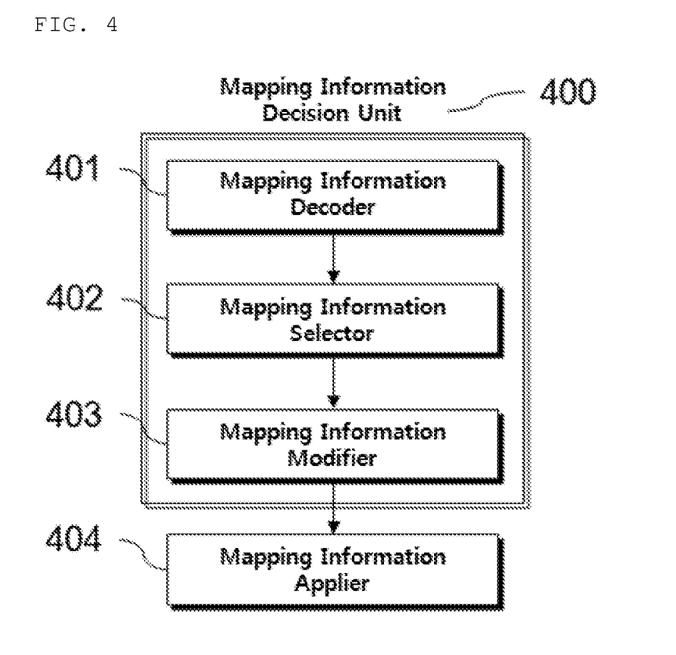
FIG. 4 is a block diagram illustrating a method for decoding DR mapping information according to an embodiment of the present invention.

FIG. 4 is a block diagram illustrating a method for decoding DR mapping information according to an embodiment of the present invention.

A mapping information decision unit 400 determines DR mapping information for use in image decoding. The mapping information decision unit 400 may include at least one of a mapping information decoder 401, a mapping information selector 402, or a mapping information modifier 403.

The mapping information decoder 401 decodes data of DR mapping information, and the mapping information selector 402 selects mapping information based on information acquired from the mapping information decoder 401. The whole mapping information may be received from a video encoder and specific mapping information may be selected from the received whole mapping information based on an index. Or a plurality of pieces of mapping information may be pre-defined in the video decoder. In this case, only an index may be received and mapping information may be selected based on the received index. Since the mapping information has been described in detail with reference to FIG. 3, its detailed description will not be provided herein.

The mapping information modifier 403 modifies the whole or part of the mapping information selected by the mapping information selector 402. If the current mapping information to be used for decoding is identical to existing mapping information, the mapping information modifier 403 uses the mapping information using the decoded information received from the mapping information selector 402. If the current mapping information is only partially different from the existing mapping information, the mapping information modifier 403 receives only data of a part needing modification. Thus, the mapping information may be reconfigured with a small amount of data.

In the case of DR mapping table information as an example of data that can be used in the mapping information modifier 403, at least one of the position of data to be modified in a table, a modification value, or a difference between a value in an existing table and a current value to be used may be used.

A mapping information applier 404 applies the mapping information acquired from the mapping information decision unit 400 to a image to be decoded.

Figure 5:
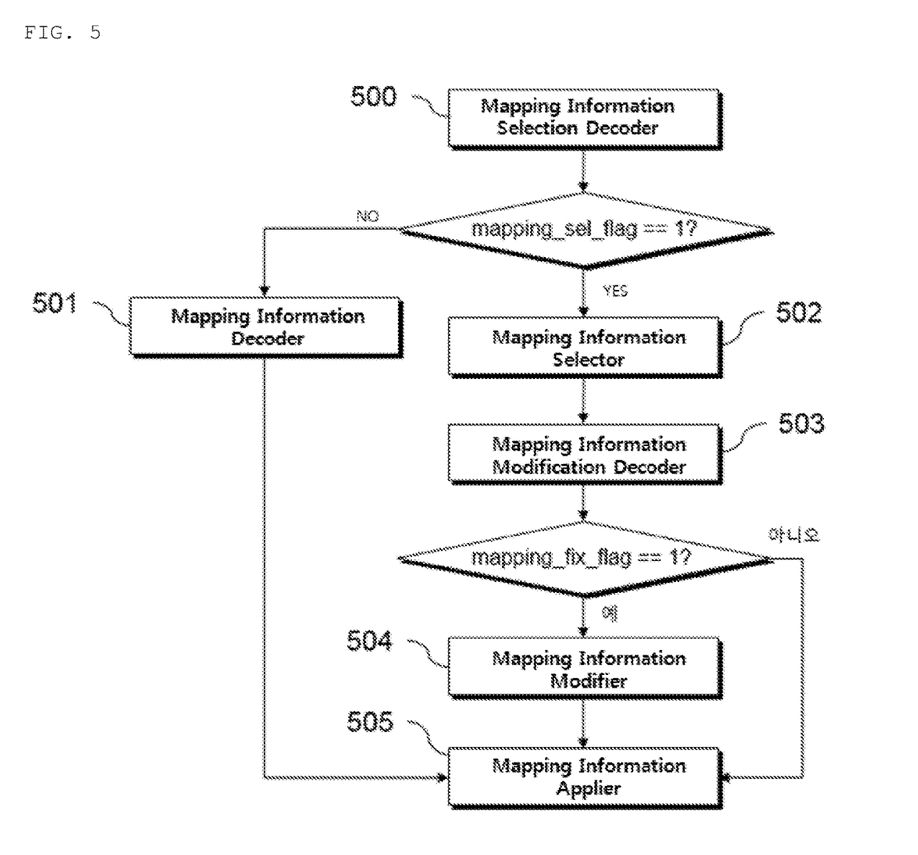
FIG. 5 illustrates an algorithm for performing an exemplary method for decoding DR mapping information.

FIG. 5 illustrates an algorithm for performing an exemplary method for decoding DR mapping information.

A mapping information selection decoder 500 decodes a syntax indicating mapping information selection or mapping information decoding. If mapping_sel_flag is 0, a mapping information decoder 501 decodes mapping information. If mapping_sel_flag is 1, a mapping information selector 502 selects part of pre-defined mapping information in the video decoder.

A mapping information modification decoder 503 determines whether to modify the mapping information selected by the mapping information selector 502. If mapping_fix_flag is 0, the mapping information is used without modification. If mapping_fix_flag is 1, the mapping information is used after it is partially modified by a mapping information modifier 504. Since the method for modifying mapping information partially has been described before with reference to FIG. 4, its detailed description is not provided herein.

Finally, a mapping information applier 505 applies the mapping information determined in the above operation to a image to be decoded.

Figure 6:
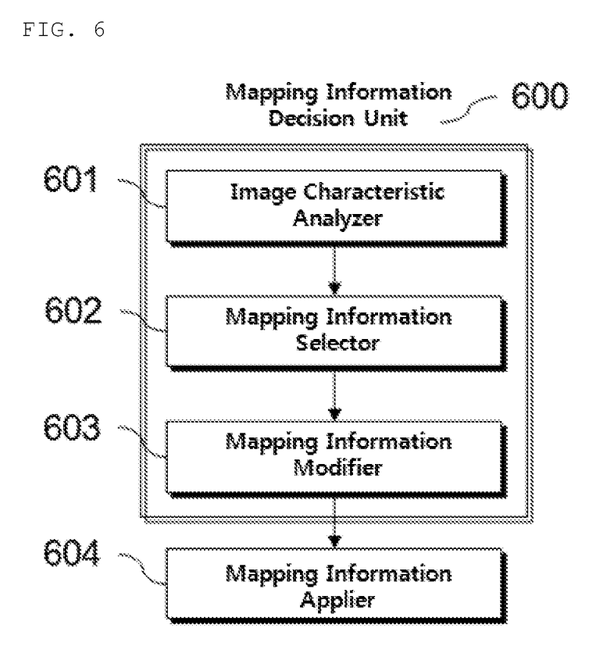
FIG. 6 is a block diagram illustrating a method for selecting DR mapping information according to image characteristics according to an embodiment of the present invention.
Figure 7:
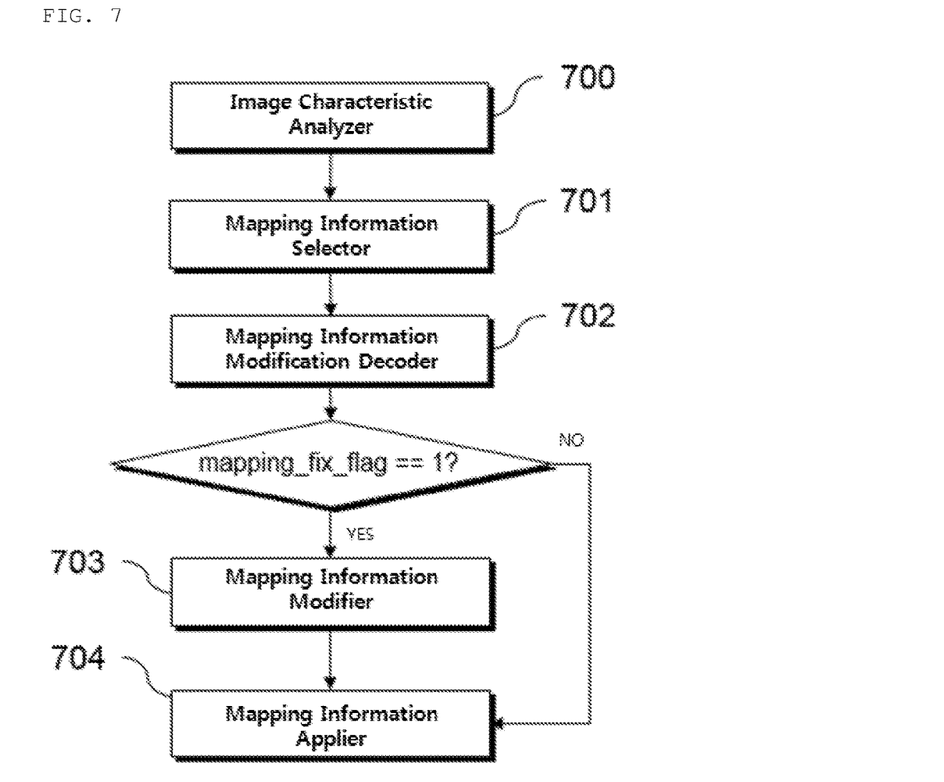
FIG. 7 illustrates an algorithm for performing an exemplary method for selecting DR mapping information according to image characteristics.

FIG. 6 is a block diagram illustrating a method for selecting DR mapping information according to image characteristics according to an embodiment of the present invention.

A mapping information decision unit 600 determines DR mapping information for use in image decoding. The mapping information decision unit 600 may include at least one of a image characteristic analyzer 601, a mapping information selector 602, or a mapping information modifier 603.

The image characteristic analyzer 601 analyzes the whole or part of a current image to be decoded. For example, a result of analyzing a picture or block of a base-layer image or an enhancement-layer image at the position of a current image to be decoded is compared with previous analysis results and then a position having a similar result is detected.

The mapping information selector 602 selects mapping information for the position having the similar analysis result based on the analysis result obtained through the image characteristic analyzer 601. The mapping information modifier 603 partially modifies the mapping information selected by the mapping information selector 602. If it is determined through the image characteristic analyzer that a image characteristic for the current position to be decoded is similar to a image characteristic for the selected position, the mapping information is used without any modification. If the image characteristics are partially different, the information for the corresponding position is modified. If modification is required, the decoder may modify a table or parameter of mapping information based on the analysis result or may modify it based on information required for the modification, received from the encoder. In this case, the modification method described in FIG. 4 is also applicable in the same/similar manner.

A mapping information applier 604 applies the mapping information obtained through the mapping information decision unit 600 to an image to be decoded.

Figure 8:
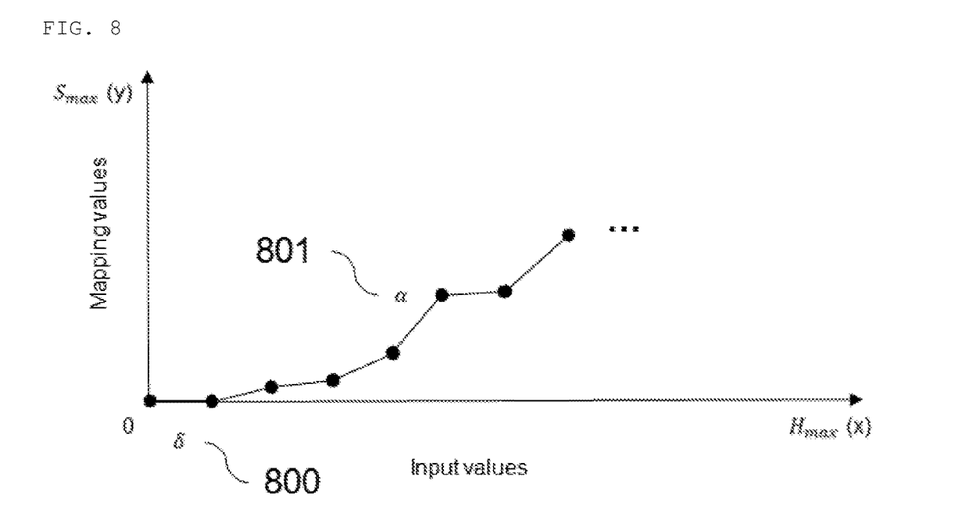
FIG. 8 is an exemplary view illustrating a method for using DR mapping information.

FIG. 8 is an exemplary view illustrating a method for using DR mapping information.

The DR may be used in a mapping embodiment for an original signal relating to each of HDR and SDR. In the illustrated graph, the horizontal axis (input value) represents DR values of an enhancement-layer image and the vertical axis (mapping value) represents DR values of a base-layer image. Now, a description will be given of a method for mapping the DR of an enhancement-layer image to the DR of a base-layer image using decoded data. In a similar method, the DR of a base-layer image may be mapped to the DR of an enhancement-layer image using decoded data.

A delta ($\delta$) 800 represents the size of each segment of the DR of an enhancement-layer image and an alpha ($\alpha$) 801 represents the inclination of each DR segment. That is, mapping information between an enhancement-layer image and a base-layer image may be represented by $\alpha$ and $\delta$. According to an embodiment of the present invention, $\alpha$ and $\delta$ may be decoded at various levels as illustrated in FIG. 3 and the decoded data may be used as follows.

Information indicating whether $\delta$ is equal across all DR segments may be signaled. This may be signaled at a high decoding level (e.g., a VPS, an SPS, etc.).

If $\delta$ is equal across all segments according to the signaling, $\delta$ may be decoded only once at a corresponding decoding level. On the other hand, if $\delta$ is different in each DR segment, $\delta$ may be decoded as in [Equation 1] and [Equation 2] or used by adding $\delta$ to previous information. For this purpose, information indicating whether $\delta$ is prediction-encoded based on previous information may be signaled. Herein, the previous information may be the size of a segment previous to the current segment or the middle, mean, most frequent, minimum, or maximum value of the sizes of a plurality of segments previous to the current segment. In [Equation 1], $\delta_{cur}$ represents the size of a current segment at a decoding time point. In [Equation 2], $\delta_{prev}$ represents the size of a previous segment. $\delta_{diff}$ is the difference between $\delta_{cur}$ and $\delta_{prev}$, which is already calculated in the video encoder and then transmitted to the video decoder. The video decoder may calculate $\delta$ by summing $\delta_{diff}$ and $\delta_{prev}$.

$$\delta = \delta_{cur'} \quad \text{[Equation 1]}$$

$$\delta = \delta_{diff} + \delta_{prev'} \quad \text{[Equation 2]}$$

Information indicating whether $\alpha$ is equal across all segments may be signaled. This may be signaled at a high decoding level (e.g., a VPS, an SPS, etc.).

If $\alpha$ is equal across all DR segments according to the signaling, $\alpha$ may be decoded only once at a corresponding decoding level. On the other hand, if $\alpha$ is different in each segment, $\alpha$ may be decoded as in [Equation 3] and [Equation 4] or used by adding $\alpha$ to previous information. For this purpose, information indicating whether $\alpha$ is prediction-encoded based on previous information may be signaled. Herein, the previous information may be the inclination of a segment previous to the current part or the middle, mean, most frequent, minimum, or maximum value of the inclinations of a plurality of segments previous to the current segment. In [Equation 3], $\alpha_{cur}$ represents the inclination of a current part at a decoding time point. In [Equation 4], $\alpha_{prev}$ represents the inclination of a previous segment. $\alpha_{diff}$ is the difference between $\alpha_{cur}$ and $\alpha_{prev}$, which is already calculated in the image encoder and then transmitted to the image decoder. The image decoder may calculate $\alpha$ by summing $\alpha_{diff}$ and $\alpha_{prev}$.

$$\alpha = \alpha_{cur'} \quad \text{[Equation 3]}$$

$$\alpha = \alpha_{diff} + \alpha_{prev'} \quad \text{[Equation 4]}$$

Herein, the decoded inclination may be an already calculated result as in [Equation 5] or the difference between y-axis values. In this case, $\alpha$ may be calculated by [Equation 6]. Or $\alpha$ may be induced by [Equation 5] or [Equation 6] in the video decoder. For example, $\alpha$ may be determined, taking into account the size of an HDR segment and the size of an SDR segment corresponding to the HDR segment.

$$\alpha = \frac{y_n - y_{n-1}}{x_m - x_{m-1}}, \ 0 < m < H_{max}, \ 0 < n < S_{max}, \quad \text{[Equation 5]}$$

$$\alpha = \frac{y_{diff}}{\delta}, \ y_{diff} = y_n - y_{n-1} \quad \text{[Equation 6]}$$

According to the embodiment, DR mapping of FIG. 8 may be applied for a residual signal. In the embodiment, an input value of the horizontal axis (i.e., residual signal) may be expressed as a mapping value of the vertical axis by FIG. 8. When this expression method is used at an encoder, a mapping value may be inverse-mapped to a residual signal being a input value based on FIG. 8 in the decoding process. FIG. 8 illustrates that an interval of the input value is mapped to an interval of the mapping value. An interval of the mapping value may be smaller than an interval of the input value. An interval of the mapping value may be equal to or greater than an interval of the input value. A length of each interval relating to the mapping value and the input value may be the same or different from each other. A predetermined mapping value may be set for each interval. A predetermined mapping value may be a pre-defined value or derived variably. According to the embodiment, a mapping graph may be represented to be discontinuous. In the embodiment, delta (800) represents a size of each interval for a residual signal being a input value and alpha (801) represents a gradient of each interval. A mapping relation between a residual signal and a mapping value may be expressed based on the delta and the alpha. The process of mapping a residual signal to a mapping value or inverse-mapping a mapping value to a residual signal may be performed based on the method mentioned above or any method similar to the method mentioned above. A mapping or inverse-mapping process may be performed using at least one of equations (1)-(6). A mapping or inverse-mapping process may be performed using a mapping table which represents the relation between an input value and a mapping value. Also, a signal may be reconstructed by mapping the residual signal to any other gradient value according to a size of a predictive signal. The gradient value may be determined using the accummlte sum through the received residual parameter. The mapping to any other gradient value may be calculated based on at least one of arithmetic operation (e.g., addition, subtraction, multiplication, division) or shift operation. A reconstructed value may be generated by adding this mapped value to the predictive value. A reconstructed value may be stored in a memory after a in-loop filtering process is applied to a reconstructed value.

What is claimed is:

1. A method of decoding an image, the method comprising:
  analyzing an image characteristic of a current image by using one or more pixels of the current block and one or more pixels of a neighboring block;
  determining mapping information based on the analyzed image characteristic; and
  decoding the current image based on the mapping information,
  wherein the mapping information is determined for each of a plurality of intervals, the plurality of intervals being obtained by dividing a luminance range for the current image equally or inequally, and
  the determining the mapping information comprises
  identifying an interval for the current image from among the plurality of intervals based on the analyzed image characteristic,
  obtaining modification information corresponding to the identified interval, and
  modifying the mapping information by adding the mapping information and the modification information,
  wherein whether to modify the mapping information is determined based on a flag transmitted from an image encoding apparatus,
  wherein the modification information is included in a sequence parameter set (SPS) in a bitstream received from an image encoding apparatus,
  wherein the modification information is received for an interval which needs to be modified, and
  wherein the modification information comprises information on a position of the interval which needs to be modified and a modification value needed for the modification.

2. A method of encoding an image, the method comprising:
  analyzing an image characteristic of a current image by using one or more pixels of the current block and one or more pixels of a neighboring block;
  determining mapping information based on the analyzed image characteristic; and
  encoding the current image based on the mapping information,
  wherein the mapping information is determined for each of a plurality of intervals, the plurality of intervals being obtained by dividing a luminance range for the current image equally or inequally, and
  the determining the mapping information comprises
  identifying an interval for the current image from among the plurality of intervals based on the analyzed image characteristic,
  obtaining modification information corresponding to the identified interval, and
  modifying the mapping information by adding the mapping information and the modification information,
  wherein a flag used to determine whether to modify the mapping information is encoded by an image encoding apparatus,
  wherein the modification information is encoded into a sequence parameter set (SPS) by an image encoding apparatus,
  wherein the modification information is encoded received for an interval which needs to be modified, and
  wherein the modification information comprises information on a position of the interval which needs to be modified and a modification value needed for the modification.

* * * * *